Figure 1:
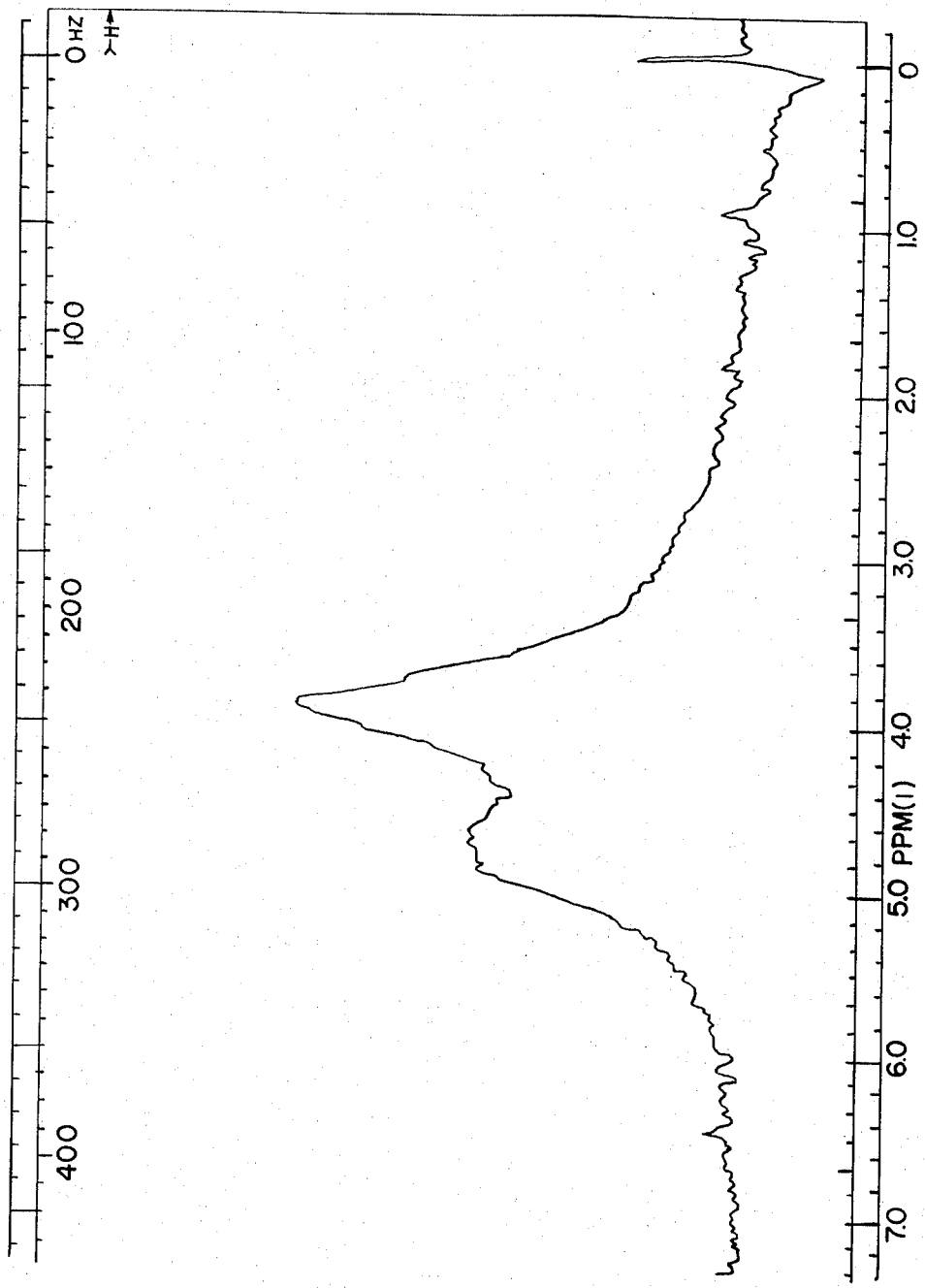

United States Patent [19]
Fukuoka et al.

[11] 3,856,775
[45] Dec. 24, 1974

[54] β-(1 → 3)-GLUCANS

[75] Inventors: Fumiko Fukuoka, Tokyo; Goro Chihara, Saitama-ken; Junji Hamuro, Tokyo, all of Japan

[73] Assignee: Ajinomoto Co., Inc., Tokyo, Japan

[22] Filed: Aug. 17, 1972

[21] Appl. No.: 281,425

Related U.S. Application Data

[63] Continuation-in-part of Ser. No. 53,470, July 9, 1970, abandoned.

[30] Foreign Application Priority Data

July 14, 1969 Japan.............................. 44-55612

[52] U.S. Cl. .............................. 260/209 R, 424/180
[51] Int. Cl................................................ C07g 3/00
[58] Field of Search.................. 260/209 R, 53, 470

[56] References Cited
UNITED STATES PATENTS

| | | | |
|---|---|---|---|
| 3,236,832 | 2/1966 | Opie et al. | 260/209 R |
| 3,297,604 | 1/1967 | Germino | 260/209 R |
| 3,301,848 | 1/1967 | Halleck | 260/209 R |
| 3,356,674 | 12/1967 | Ikeda et al. | 260/209 R |
| 3,396,082 | 8/1968 | Davis et al. | 260/209 R |
| 3,436,346 | 4/1969 | Westover et al. | 260/209 R |
| 3,555,006 | 1/1971 | Storfer | 260/209 R |

*Primary Examiner*—Johnnie R. Brown
*Attorney, Agent, or Firm*—Hans Berman; Kurt Kelman

[57] ABSTRACT

β-(1 → 3)-glucans having dialdehyde, di- or trihydroxy methyl, erythritol or glycerol terminal moieties are useful in inhibiting tumors of sarcoma in mice. The glucans may be prepared from β-(1 → 3)-glucans having side chains attached by (1 → 6), (1 → 4) or (1 → 2)-linkages by sequential oxidation, reduction and hydrolysis of the side chains.

2 Claims, 3 Drawing Figures

β-(1 → 3)-GLUCANS

This application is a continuation-in-part of the copending application Ser. No. 53,470, filed July 9, 1970, now abandoned.

The present invention relates to polysaccharides having antitumor activity against sarcoma in mice and to methods of producing the same.

It is known that various polysaccharides isolated from plants, Basidiomycetes and microbial cells show such anti-tumor activity in mice, however, these known tumor inhibiting polysaccharides are generally mixtures of active polysaccharides and inactive polysaccharides.

It has now been found that an inactive glucan having β-(1 → 3)-linkages in the main chain and additionally having other linkages, such as β-(1 → 2), β-(1 → 4) or β-(1 → 6)-linkages in the main chain and/or in side chains, when oxidized to split the 1,2-glycol linkages of glucose (glycol cleavage), shows tumor inhibiting activity against sarcoma in mice. It has also been found that the oxidized glucan, when hydrogenated or reduced, also shows such tumor inhibiting activity. It has further been found that the oxidized and thereafter reduced glucan, when mildly hydrolyzed, yields a β-(1 → 3)-glucan showing even stronger inhibiting activity.

The starting materials which can be used in the present invention include β-pachyman which can be obtained by extracting Poria cocos, and is reported to be a β-(1 → 3)-glucan having one internal β-(1 → 6) linkage and three branched β-(1 → 6) linkages in each molecule, laminarin obtained from sea-weeds, and other glucans obtained by microbial cultivation or

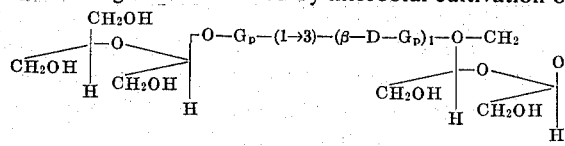

from various plants. The starting materials also include glucans having the characteristic linkages indicated above and showing some anti-tumor activity.

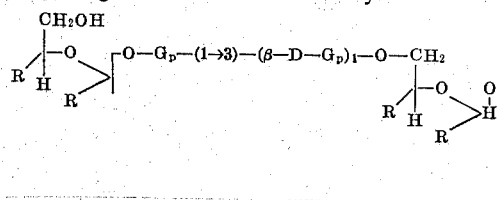

According to the present invention, the glucan employed as a starting material is dissolved or suspended in water. When the glucan is soluble in alkali, it can be dissolved in an aqueous alkaline solution which may then be neutralized. An oxidizing agent is added to the aqueous glucan solution or suspension, and the oxidation reaction is performed in the dark at 0° to 30°C, while stirring, until the 1,2-glycol linkages of the glucan are broken.

Suitable oxidizing agents include periodates, such as periodic acid or sodium metaperiodate, and lead tetraacetate. The amount of the oxidizing agent varies with the number of 1,2-glycol linkages in the glucan used, and generally is between one mole and a few moles per mole-equivalent of 1,2-glycol linkages. The oxidation reaction generally is terminated in 20 to 72 hours to avoid further decomposition of the glucan and a resulting decrease in anti-tumor activity.

The oxidized glucan is precipitated from the reaction mixture by adding alcohol, and the precipitate is recovered by centrifuging or by filtration. The precipitate can be purified by washing with water, alcohol or ether.

The oxidized glucan can be represented by the following formula:

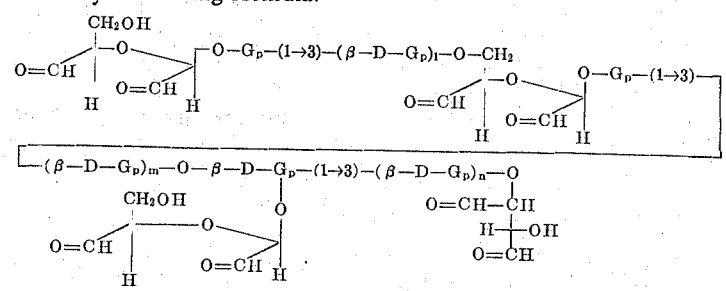

wherein $G_p$ is glucopyranosyl, and $l$, $n$, $m$ are integers which jointly may amount to 120 or more.

The oxidized glucans show good anti-tumor activity in mice, however, some are unstable because of two aldehyde groups in the same moiety. Accordingly, they are preferably converted to stable compounds by reducing the aldehyde groups to hydroxymethyl groups.

The oxidized glucans may be reacted with reducing agents conventionally used for selective reduction of formyl groups, such as sodium borohydride and lithium aluminum hydride, or by catalytic hydrogenation. The resulting β-(1 → 3)-glucan has moieties having two or three hydroxymethyl groups in the main chain and/or side chains, and it also possesses good anti-tumor activity in mice.

The reduced glucan may be represented by the following formula:

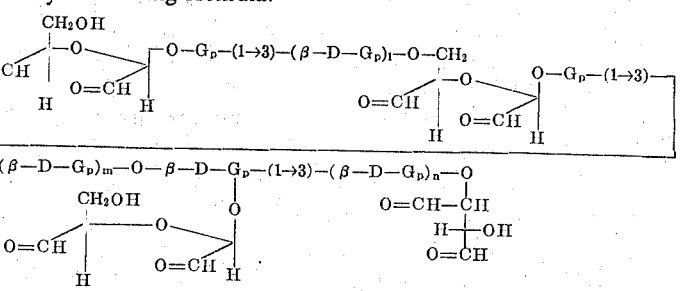

The oxidized glucans and the oxidized and reduced glucans of the invention may jointly be represented by the formula:

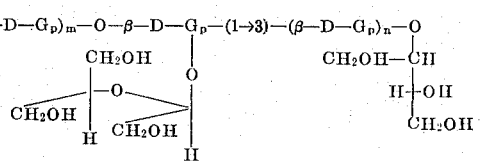

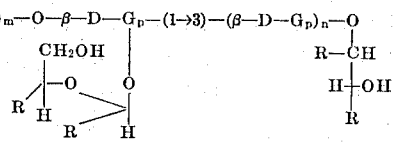

wherein R is formyl or hydroxymethyl, $G_p$ is glucopyranosyl, $l$, $m$, and $n$ are integers, and $l + m + n$ is at least 120.

When moieties having two aldehyde or two or three hydroxymethyl groups linked to β-(1 → 3)-glucan are removed by mild hydrolysis, the resulting β-(1 → 3)-glucan is much more stable and shows strong anti-tumor activity against the aforementioned sarcoma.

In order to hydrolyze moieties having plural aldehyde or hydroxymethyl groups, the glucan is dissolved in or suspended in water, and a dilute mineral acid, such as 0.1 normal sulfuric acid, or a dilute alkali, such as aqueous 6% NaOH solution, is added to the glucan solution or suspension, and the mixture is stirred at 5°C to 30°C for several hours to several days.

The desired product is precipitated from the reaction mixture by adding alcohol, and the precipitated $\beta$-(1 $\rightarrow$ 3)-glucan is recovered by centrifuging or filtration. The precipitate can be purified by washing with water, alcohol, or ether. The purified glucan has only $\beta$-(1 $\rightarrow$ 3) glucosidic linkages and a terminal radical of a sugar alcohol.

Anti-tumor glucans which can be obtained according to the present invention are used for treating tumors of mice by administrating them orally or by injection to the animals.

The hydrolyzed glucans can be represented by the following two formulas:

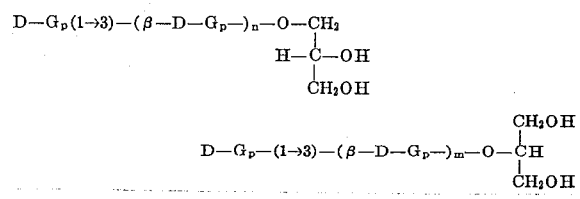

In these formulas, $n$ is an integer and at least 60, and $m$ is an integer not substantially smaller than 60. The hydrolyzed glucans may jointly be represented by the formula $$D-G_p-(1 \rightarrow 3)-(\beta-D-G_p)_o-O-CHR_1-CHOH-CH_2OH$$

wherein $R_1$ is hydroymethyl or hydrogen, $G_p$ is glucopyranosyl, and $o$ is an integer and at least 60.

The following Examples are further illustrative of this invention.

EXAMPLE 1

15 g $\beta$-Pachyman which had been extracted from defatted Poria cocos with aqueous 2% NaOH solution, fractioned and purified was suspended in 800 ml water (ph 7.3). The suspension was stirred for a few minutes, 300 ml 0.1M NaIO$_4$ solution was added, and the mixture was stirred at room temperature in a dark room for 40 hours. The final pH of the reaction mixture was 4.6.

The precipitate formed was isolated by centrifuging at 10,000 r.p.m. for 10 minutes, washed twice with methanol and ethanol, and dried in a vacuum. A colorless and slightly tacky powder of a $\beta$-(1 $\rightarrow$ 3)-glucan was obtained and weighed 13 grams. The powder had substantially no solubility in water (8.8 mg/dl at 20°C measured by freeze-drying method), was sparingly soluble in alkali, and its infra-red absorption spectrum showed absorption bands corresponding to an aldehyde group. The intrinsic viscosity of the power was 0.44 in 10% NaOH, and that of the starting material was 0.77. The molecular weight of the powder was about 370,000 as determined by light-scattering, while that of the starting $\beta$-pachyman was about 374,200.

The powder and the starting material were tested for their respective antitumor activities, and the results obtained are listed in the following Table 1.

Table 1

| Sample tested | Dose (mg/kg × day) | Inhibition ratio (%) | Complete regression |
|---|---|---|---|
| Starting material | 5 × 10 | 0 | 0/8 |
| Starting material | 1 × 10 | −3.0 | 0/9 |
| End product | 5 × 10 | 40 | 2/9 |

In each test, Swiss albino mice were given subcutaneous injections into the right groin of 0.05 ml of Sarcoma 180 ascites seven days old. 24 Hours after the injection, and daily thereafter for a total of ten days, one group of ten mice was given intraperitoneal injections of the tested sample. A control group did not receive such intraperitoneal injections. After five weeks, the surviving mice were killed, the tumors were excised and weighed, and the inhibiting effect of the samples on the tumors was evaluated from the difference in average weight between the tumors recovered from treated and untreated mice, and the "inhibition ratio" and "complete regression" were recorded. EXAMPLE 2

Two laminarin in 200 ml water and 66 ml 0.1M NaIO$_4$ solution were mixed, and the mixture was stirred at room temperature in a dark room for 68 hours. The final pH of the reaction mixture was 2.9. A precipitate formed and was isolated by centrifuging, washed with methanol and then ether, and dried. The resulting colorless powder of the oxidized laminarin weighed 1.6 grams.

The powder had a specific rotatory power of $[a]_D^{22} = +14°(C=1, 1\% \text{ NaOH})$, and its infra-red absorption spectrum showed the specific bands of aldehyde groups.

The powder and laminarin were tested for their anti-tumor effects as in Example 1, and the results were as follows:

| Sample | Dose mg/kg × day | Inhibition ratio (%) | Complete regression |
|---|---|---|---|
| Laminarin | 25 × 10 | 1.5 | 0/9 |
| Laminarin | 5 × 10 | 3.0 | 0/8 |
| Oxidized laminarin | 5 × 10 | 38 | 2/9 |

EXAMPLE 3

3.7 g $\beta$-Pachyman was suspended in 450 ml water (pH 7.2). The gelled suspension was stirred and then mixed with 150 ml 0.1M NAIO$_4$ solution. The mixture was stirred at room temperature in a dark room for 40 hours. The pH of the reaction mixture was adjusted to 4.2 with acetic acid, and a colorless paste-like precipitate formed thereby was recovered by centrifuging and washed with water. The precipitate was suspended in 200 ml water, and a mixture of 800 mg sodium borohydride and 100 ml water was added dropwise to the suspension with slow stirring. The resulting mixture was stirred for an additional 20 hours at room temperature. Additional 300 mg NaBH$_4$ was added to the mixture which was then stirred for 40 hours. The pH of the reaciono mixture was adjusted from 10.2 to 6.0 with acetic acid, and the mixture was stirred for a few minutes. A paste-like precipitate formed, was recovered by centrifuging, washed with alcohol and then with ether, spread on a pertri dish, and dried in a vacuum. A colorless powder of anti-tumor glucan was obtained in an amount of 3.0 g.

An infra-red absorption spectrum of this powder did not show any absorption bands specific for aldehyde or carboxyl groups. The powder was substantially insoluble in water (about 1 mg/dl at 20°C as determined by freeze-drying), soluble in alkali, and had a specific rotatory power of $[\alpha]_D^{22} = 30\ 10°$ ($C=0.3$, 10% NaOH). A hydrolzate of the powder prepared with exo-$\beta$-1,3-glucanase of Sclerotium libertiana was found by thin-layer chromatography to contain O$\beta$-D-glucopyranosyl-D-erythritol as well as glucose. An elementary analysis of the powder showed 38.18% carbon and 6.88% hydrogen. No N, P, S, or ash were found.

The powder was tested for anti-tumor activity as in Example 1, and showed an inhibition ratio of 80%. Five out of nine treated (5/9) showed complete regression of the tumor.

EXAMPLE 4

1.4 Grams of the anti-tumor glucan which had been obtained in Example 3 was suspended in 100 ml 0.1N $H_2SO_4$, and the mixture was vigorously stirred at room temperature for 24 hours. The precipitate which formed in the reaction mixture was isolated by centrifuging at 10,000 r.p.m. for 15 minutes, washed sequentially with water, methanol, and ether, and dried to give 1.2 g colorless powder of a $\beta$-(1 → 3)-glucan.

The powder thus obtained was substantially insoluble in water (46.65 mg/dl), soluble in alkali, and had a specific rotatory power of $[\alpha]_D^{22}=+23.3$. The infra-red absorption spectrum of the powder did not show any bands corresponding to those of the aldehyde or carboxyl group. O-$\beta$-D-glucopyranosyl-D-erythritol and O-$\beta$-D-glucopyranosyl-D-glycerol as well as glucose were found in hydrolyzates of the powder prepared with exo-$\beta$-1,3-glucanase of Sclerotium libertiana, and glycerol, ethylene glycol, and glucose were formed by Smith's degradation. Partial acetoylsis was found by gas chromatography to give only glucose octaacetate and laminaribiose octaacetate, and not to give gentiobiose octaacetate. An elementary analysis of the powder showed 39.13% carbon and 6.99% hydrogen, and no nitrogen, phosphorus, sulfur or ash. The molecular weight of the powder was 192,000 as determined by the light-scattering method. The nuclear magnetic resonance spectrum of the powder which was obtained by using HCOOH—$d_2$ as a solvent is shown in FIG. 1 of the accompanying drawing.

The powder was tested for anti-tumor effect as in Example 1. The inhibition ratio was found to be 99%, and 9 out of 10 treated mice (9/10) showed complete regression of the tumor.

EXAMPLE 5

2 g Anti-tumor glucan having aldehyde groups as obtained in Example 1 was suspended in 100 ml of 0.1N $H_2SO_4$, the suspension was vigorously stirred at room temperature for 26 hours, and 1.7 g colorless powder of anti-tumor $\beta$-(1 → 3)-glucan was obtained.

Figure 2:
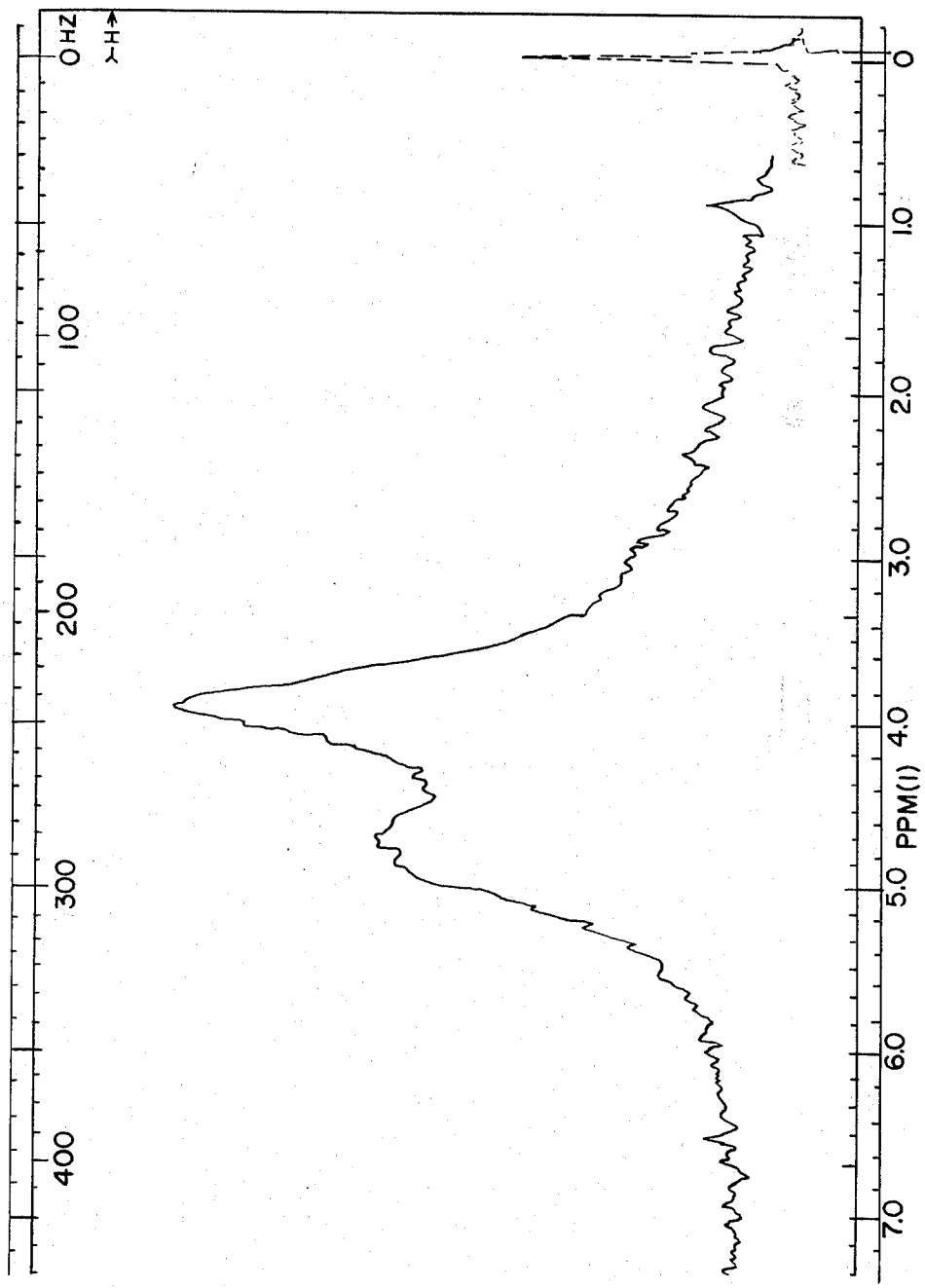
Figure 3:
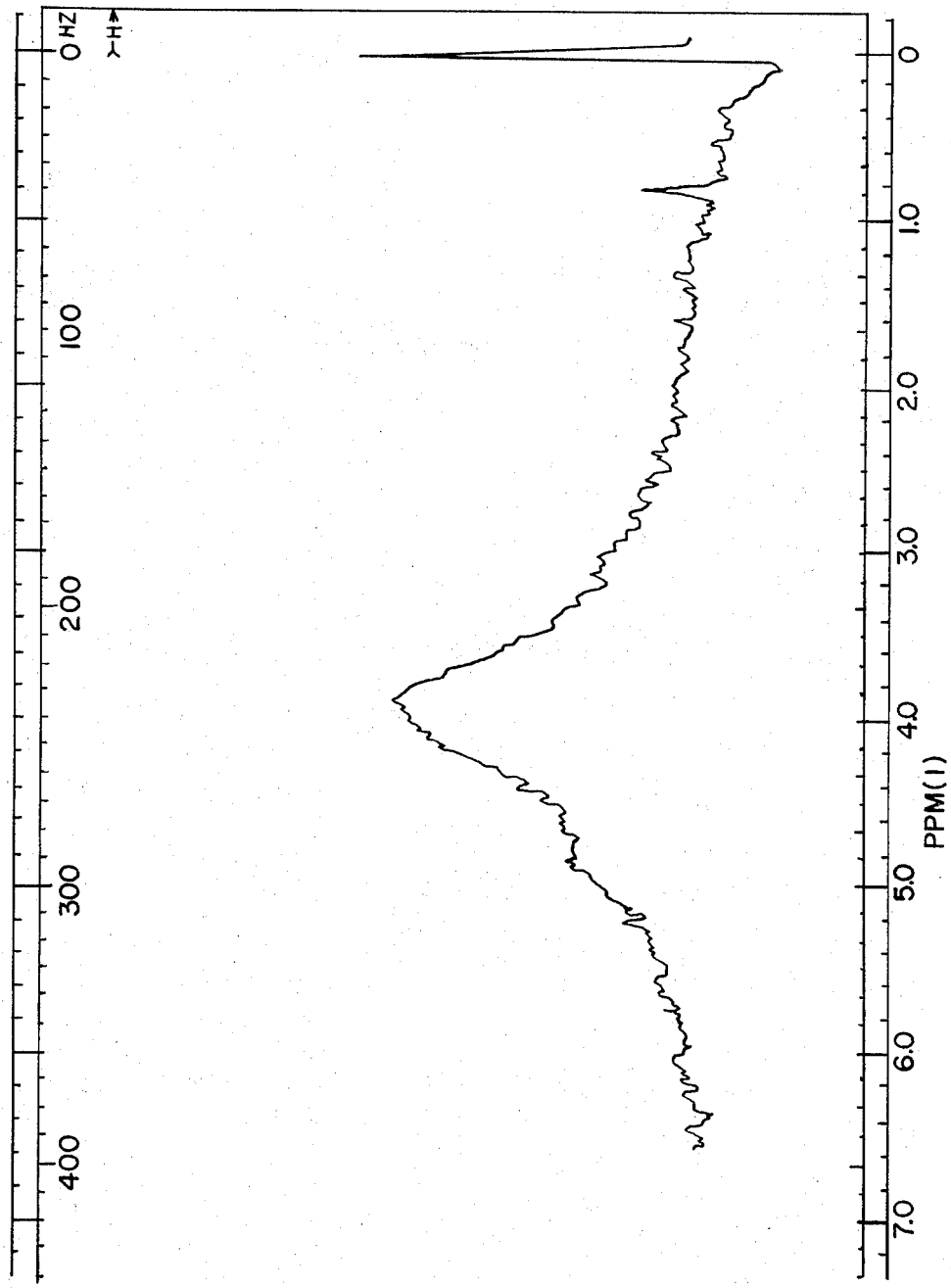

The properties of the powder thus obtained were almost identical with those of the powder obtained in Example 4. The NMR spectra of the powder and of $\beta$-pachyman respectively are shown in FIG. 2 and FIG. 3 of the accompanying drawing.

Only glucose and glycerol were found by gas chromatography in a Smith degradation product of the powder. The intrinsic viscosity was 0.25.

The powder was tested for its anti-tumor effect as in Example 1. The inhibition ratio was found to be 96.4%, and 8 out of 10 treated mice showed complete regression of the tumor.

EXAMPLE 6

2 g Laminarin was treated as in Example 2, and the resulting product, after being washed with water, was suspended in 200 mil water. 66 Ml water and 600 mg $NaBH_4$ were added, and the mixture was stirred for 20 hours. In order to complete the reduction reaction, additional 200 mg $NaBH_4$ was added to the reaction mixture, which was then stirred for 5 hours. The pH of the reaction mixture was adjusted from 10.8 to 4.1 with acetic acid with stirring, and a precipitate of oxidized and then reduced laminarin was isolated by centrifuging, sequentially washed with water, ethanol, and ether, and dried. An anti-tumor $\beta$-(1 → 3)-glucan whose moieties had two or three hydroxymethyl groups was obtained in an amount of one gram as colorless powder.

0.7 g powder was added to 80 ml of 0.1N $H_2SO_4$, and the mixture was vigorously stirred at room temperature for 20 hours to hydrolyze the terminal moieties having hydroxymethyl groups. 120 Ml ethanol was added to the reaction mixture, and the precipitate formed was isolated by centrifuging and washed with ethanol and then with ether. An anti-tumor $\beta$-(1 → 3)-glucan was obtained in an amount of 670 mg as a colorless powder.

The powder was soluble in water, easily soluble in alkali, and had a specific rotatory power of $[\alpha]_D^{22} = +23.1$ ($c=1$, 10% NaOH). The infra-red absorption spectrun of the powder did not show any absorption band indicative of aldehyde or carboxyl groups. It gave only glucose and glycerol by Smith degradation and glucose and glucopyranoylerythritol by hydrolysis with exo-$\beta$-1,3-glucanase. Acetolysis of the powder was found to give only glucose octaacetate and laminaribiose octaacetate.

The intermediate powder (oxidized and then reduced laminarin) and the final powder (oxidized, reduced and then hydrolyzed laminarin) were tested for their anti-tumor effects as in Example 1, and the results were as follows:

| Sample | Dose mg/kg × day | Inhibition ratio (%) | Complete regression |
|---|---|---|---|
| Intermediate powder | 5 × 10 | 40 | 0/10 |
| Final powder | 5 × 10 | 82 | 6/9 |

EXAMPLE 7

3.7 g $\beta$-Pachyman was vigorously stirred with 400 ml water in a Waring blender to form a suspension of pH 5.85 to which a mixture of 3.21 g $NaIO_4$ and 150 ml water was added. The resulting mixture was vigorously stirred at room temperature in a dark room. The reaction mixture whose pH was 5.3 was mixed with 10 ml ethyleneglycol, and stirred for 40 hours to decompose any remaining sodium metaperiodate. The pH of the reaction mixture was adjusted to 1.0 with 3 ml concentrated sulfuric acid, and the solution was stirred for a further 21 hours. The precipitate which formed in the reaction mixture was isolated by centrifuging, washed with methanol, and dried to give 2.7 g powder.

The powder was tested for its anti-tumor activity, and the inhibition ratio was found to be 95%, and 7 out of 10 treated mic showed complete regression of the tumor.

EXAMPLE 8

1.8 Grams of a polysaccharide whose main chain was a $\beta$-(1 $\rightarrow$ 3)-glucopyranoside and which had been obtained by extraction of Flammulina veltipes was stirred with 200 ml water. To the resulting suspension 1.6 g $NaIO_4$ in 50 ml water added, and the resulting mixture was stirred for 50 hours as in the preceding Examples. The resulting precipitate was isolated and suspended in 300 ml water containing 1 g sodium borohydride, and the mixture was stirred into a dark solution for 15 hours. A precipitate was removed by centrifuging, the supernatant was stirred with three times its volume of ethanol, and the precipitate formed thereby was recovered, washed twice each with methanol and ether, and was added to 400 ml of 1.5% $H_2SO_4$. The resulting solution was stirred for 40 hours and ethanol was added to precipitate 1.2 g colorless powder which was isolated by the procedures described above.

The powder had a specific rotatory power of $[\alpha]_D^{20} = +20$ to $+23°$ ($C=1$, 2.5N NaOH).

The starting material and the end product were tested for their antitumor activities as above, and the results were as follows:

| Sample | Dose mg/kg day | Inhibition ratio (%) | Complete regression |
|---|---|---|---|
| Starting material | 5 × 10 | 80 | 5/10 |
| End Product | 5 × 10 | 96 | 8/10 |

What is claimed is:

1. A $\beta$-(1 $\rightarrow$ 3)-glucan of the formula $$D-G_p-[(1\rightarrow 3)-(\beta-D-G_p)]_o-O-CHR_1-CHOH-CH_2OH$$

wherein $R_1$ is hydroxymethyl or hydrogen, $G_p$ is glucopyranosyl, and $o$ is an integer and at least 60.

2. A $\beta$-(1 $\rightarrow$ 3)-glucan of the formula

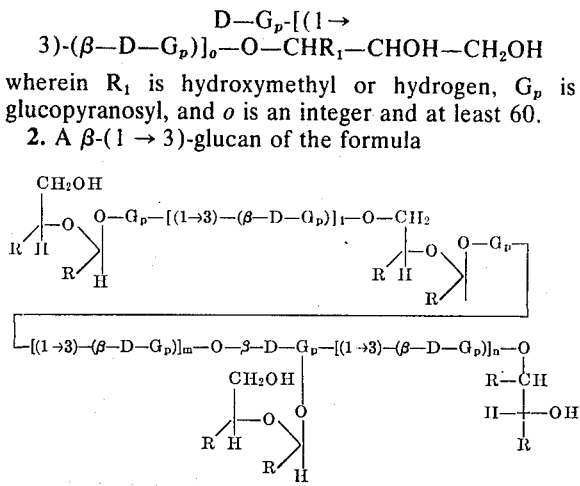

wherein R is formyl or hydroxymethyl, $G_p$ is glucopyranosyl, $l$, $m$, and $n$ are integers, and $l+m+n$ is at least 120.

* * * * *